US012632920B2

(12) United States Patent
Ihara

(10) Patent No.: US 12,632,920 B2
(45) Date of Patent: May 19, 2026

(54) IMAGE PROCESSING APPARATUS, METHOD, AND PROGRAM FOR SMOOTHING BOUNDARY OF SEGMENTED REGION

(71) Applicant: FUJIFILM Corporation, Tokyo (JP)

(72) Inventor: Satoshi Ihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 320 days.

(21) Appl. No.: 18/325,015

(22) Filed: May 29, 2023

(65) Prior Publication Data

US 2023/0306556 A1 Sep. 28, 2023

Related U.S. Application Data

(63) Continuation of application No. PCT/JP2021/042481, filed on Nov. 18, 2021.

(30) Foreign Application Priority Data

Dec. 25, 2020 (JP) ................................. 2020-217837

(51) Int. Cl.
*G06T 3/4007* (2024.01)
*G06T 7/11* (2017.01)

(52) U.S. Cl.
CPC .............. *G06T 3/4007* (2013.01); *G06T 7/11* (2017.01); *G06T 2207/20084* (2013.01)

(58) Field of Classification Search
CPC .................... G06T 3/4007; G06T 7/11; G06T 2207/20084; G06T 7/00; G06V 10/26; G06V 10/82; G06V 2201/031
See application file for complete search history.

(56) References Cited

U.S. PATENT DOCUMENTS

| 8,031,914 | B2 * | 10/2011 | Zhang | ................. | G06F 16/5854 |
| | | | | | 382/160 |
| 10,304,193 | B1 * | 5/2019 | Wang | ................... | G06V 10/764 |
| 10,937,178 | B1 * | 3/2021 | Srinivasan | .............. | G06T 7/521 |

(Continued)

FOREIGN PATENT DOCUMENTS

| JP | 2019211900 | 12/2019 |
| JP | 2020038574 | 3/2020 |

(Continued)

OTHER PUBLICATIONS

"International Search Report (Form PCT/ISA/210) of PCT/JP2021/042481", mailed on Feb. 1, 2022, with English translation thereof, pp. 1-5.

(Continued)

*Primary Examiner* — Mia M Thomas
(74) *Attorney, Agent, or Firm* — JCIPRNET

(57) ABSTRACT

A processor is configured to convert a size of a target image to derive a size-converted image, segment the size-converted image into regions of at least one class by using a segmentation model constructed by machine-learning a neural network to derive a plurality of class images in which a pixel value of each pixel represents class-likeness for the at least one class, convert a size of at least one class image into the size of the target image to derive at least one converted class image, and segment the target image based on a pixel value in each pixel of the at least one converted class image.

8 Claims, 11 Drawing Sheets

(56)  References Cited

U.S. PATENT DOCUMENTS

| | | | | |
|---|---|---|---|---|
| 11,403,776 | B2 * | 8/2022 | Sadeghi | G06T 7/596 |
| 11,410,388 | B1 * | 8/2022 | Taghavi | G06T 17/205 |
| 11,423,563 | B2 * | 8/2022 | Duggal | G06T 7/593 |
| 11,810,388 | B1 * | 11/2023 | Wang | G06V 10/761 |
| 12,020,437 | B2 * | 6/2024 | Cha | G06T 7/0004 |
| 2017/0200067 | A1 * | 7/2017 | Zhou | G06V 30/194 |
| 2017/0287137 | A1 * | 10/2017 | Lin | G06V 10/454 |
| 2018/0218527 | A1 * | 8/2018 | Kunieda | G06V 40/16 |
| 2018/0232887 | A1 * | 8/2018 | Lin | G06T 7/11 |
| 2019/0147582 | A1 * | 5/2019 | Lee | G06T 11/00 |
| | | | | 382/156 |
| 2019/0197723 | A1 * | 6/2019 | Tanaka | G06T 7/00 |
| 2019/0239926 | A1 * | 8/2019 | Pavlovskaia | A61B 17/1703 |
| 2019/0347804 | A1 * | 11/2019 | Kim | G06T 7/194 |
| 2020/0125887 | A1 * | 4/2020 | Nishii | G01M 17/027 |
| 2020/0175700 | A1 * | 6/2020 | Zhang | G06V 10/26 |
| 2020/0218948 | A1 * | 7/2020 | Mao | G06V 30/274 |
| 2020/0218961 | A1 * | 7/2020 | Kanazawa | G06N 3/045 |
| 2020/0234447 | A1 * | 7/2020 | Karmatha | G06V 10/82 |
| 2020/0258234 | A1 * | 8/2020 | Wu | G16H 30/20 |
| 2020/0387698 | A1 * | 12/2020 | Yi | G06N 3/084 |
| 2021/0035277 | A1 * | 2/2021 | Ishikawa | G06T 5/73 |
| 2021/0035342 | A1 * | 2/2021 | Glaser | G06V 20/52 |
| 2021/0049397 | A1 * | 2/2021 | Chen | G06T 7/11 |
| 2021/0081681 | A1 * | 3/2021 | Chiba | G08G 1/09 |
| 2021/0084290 | A1 * | 3/2021 | Cho | H04N 19/85 |
| 2021/0150410 | A1 * | 5/2021 | Liang | G06N 3/09 |
| 2021/0182612 | A1 * | 6/2021 | Zeng | G06N 20/00 |
| 2021/0326638 | A1 * | 10/2021 | Lee | G06V 10/764 |
| 2021/0370993 | A1 * | 12/2021 | Qian | G06N 3/0985 |
| 2022/0068017 | A1 * | 3/2022 | Lee | G06T 7/593 |
| 2022/0092291 | A1 * | 3/2022 | Lai | G06T 11/00 |
| 2022/0172369 | A1 * | 6/2022 | Tang | G06N 3/0455 |
| 2022/0188554 | A1 * | 6/2022 | Huang | G01S 13/931 |
| 2022/0375090 | A1 * | 11/2022 | Hwang | G06T 7/11 |
| 2023/0033177 | A1 * | 2/2023 | Goel | G06T 7/571 |
| 2023/0141734 | A1 * | 5/2023 | Zhou | G06V 10/82 |
| | | | | 382/173 |
| 2023/0419682 | A1 * | 12/2023 | Lee | G06T 7/70 |
| 2024/0071033 | A1 * | 2/2024 | Lee | G06V 20/69 |
| 2024/0265681 | A1 * | 8/2024 | Chavez Cortes | G06V 10/82 |
| 2024/0331114 | A1 * | 10/2024 | Zhou | G06T 5/60 |
| 2025/0008230 | A1 * | 1/2025 | Liu | H04N 7/18 |
| 2025/0139743 | A1 * | 5/2025 | Kim | G06T 7/215 |

FOREIGN PATENT DOCUMENTS

| | | | | |
|---|---|---|---|---|
| JP | | 2020119568 | 8/2020 | |
| JP | | 2020528176 | 9/2020 | |
| WO | WO-2016035338 A1 * | 3/2016 | | G05B 23/021 |

OTHER PUBLICATIONS

"Written Opinion of the International Searching Authority (Form PCT/ISA/237) of PCT/JP2021/042481", mailed on Feb. 1, 2022, with English translation thereof, pp. 1-8.

"Notice of Reasons for Refusal of Japan Counterpart Application", issued on Oct. 21, 2025, with English translation thereof, p. 1-p. 6.

"Decsion of Refusal of Japan Counterpart Application", issued on Feb. 17, 2026, with English translation thereof, p. 1-p. 5.

\* cited by examiner

Figure 3:
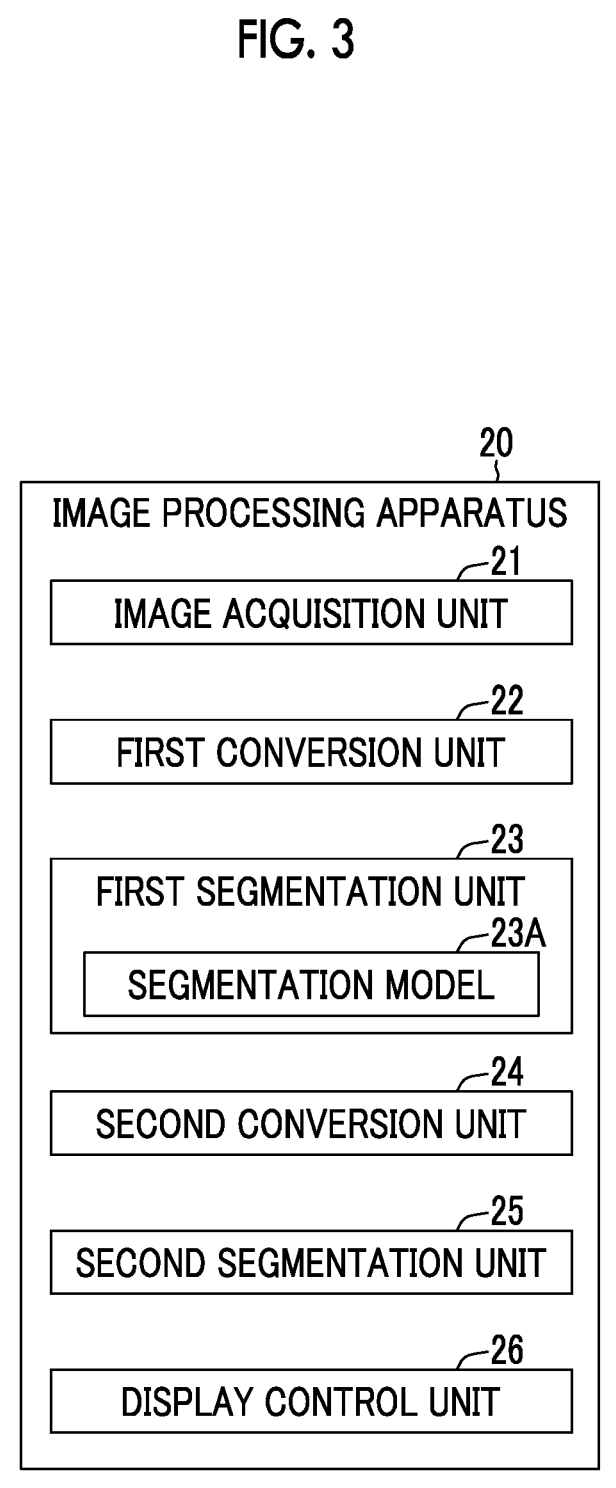

IMAGE PROCESSING APPARATUS

21
IMAGE ACQUISITION UNIT

22
FIRST CONVERSION UNIT

23
FIRST SEGMENTATION UNIT

23A
SEGMENTATION MODEL

24
SECOND CONVERSION UNIT

25
SECOND SEGMENTATION UNIT

26
DISPLAY CONTROL UNIT

FIG. 6

CLASS 0

| | | | | |
|---|---|---|---|---|
| 4 | 4 | 4 | 2 | 0 |
| 4 | 4 | 4 | 2 | 0 |
| 2 | 2 | 2 | 0 | 0 |
| 0 | 0 | 0 | 0 | 0 |

C0

CLASS 1

| | | | | |
|---|---|---|---|---|
| 0 | 1 | 2 | 3 | 4 |
| 0 | 1 | 3 | 4 | 4 |
| 0 | 0 | 2 | 3 | 4 |
| 0 | 0 | 1 | 0 | 4 |

C1

CLASS 2

| | | | | |
|---|---|---|---|---|
| 0 | 0 | 0 | 0 | 0 |
| 0 | 1 | 2 | 1 | 1 |
| 1 | 2 | 4 | 2 | 2 |
| 1 | 3 | 4 | 3 | 3 |

| | | | | |
|---|---|---|---|---|
| 0 | 0 | 0 | 1 | 1 |
| 0 | 0 | 0 | 1 | 1 |
| 0 | 2 | 2 | 1 | 1 |
| 2 | 2 | 2 | 2 | 1 |

FIG. 8

| | | | | | | | | |
|---|---|---|---|---|---|---|---|---|
| 4 | 4 | 4 | 4 | 4 | 3 | 2 | 1 | 0 |
| 4 | 4 | 4 | 4 | 4 | 3 | 2 | 1 | 0 |
| 4 | 4 | 4 | 4 | 4 | 3 | 2 | 1 | 0 |
| 3 | 3 | 3 | 3 | 3 | 2 | 1 | 0.5 | 0 |
| 2 | 2 | 2 | 2 | 2 | 1 | 0 | 0 | 0 |
| 1 | 1 | 1 | 1 | 1 | 0.5 | 0 | 0 | 0 |
| 0 | 0 | 0 | 0 | 0 | 0 | 0 | 0 | 0 |

CG0

| | | | | | | | | |
|---|---|---|---|---|---|---|---|---|
| 0 | 0.5 | 1 | 1.5 | 2 | 2.5 | 3 | 3.5 | 4 |
| 0 | 0.5 | 1 | 2 | 2.5 | 3 | 3.5 | 3.7 | 4 |
| 0 | 0.5 | 1 | 2 | 2.5 | 3.5 | 4 | 4 | 4 |
| 0 | 0 | 1 | 1.5 | 2 | 3 | 3.5 | 3.7 | 4 |
| 0 | 0 | 0 | 1 | 2 | 2.5 | 3 | 3.5 | 4 |
| 0 | 0 | 0 | 0.5 | 1.5 | 2 | 2.5 | 3.2 | 4 |
| 0 | 0 | 0 | 0.5 | 1 | 1.5 | 2 | 3 | 4 |

CG1

| | | | | | | | | |
|---|---|---|---|---|---|---|---|---|
| 0 | 0 | 0 | 0 | 0 | 0 | 0 | 0 | 0 |
| 0 | 0.5 | 1 | 1.5 | 2 | 1.5 | 1.2 | 0.5 | 0.5 |
| 0 | 0.7 | 1 | 2 | 2.3 | 2.0 | 2.5 | 1 | 1 |
| 0.5 | 0.7 | 1 | 1.5 | 2.5 | 1.8 | 1.5 | 1.5 | 1.5 |
| 0.5 | 1.5 | 2 | 3 | 4 | 3 | 2.5 | 2 | 2 |
| 1 | 1.7 | 2.5 | 3.2 | 4 | 3.2 | 2.5 | 2.5 | 2.5 |
| 1 | 2 | 3 | 3.5 | 4 | 3.5 | 3 | 3 | 3 |

CG2

| 0 | 0 | 0 | 0 | 0 | 0 | 1 | 1 | 1 | — R0 |
|---|---|---|---|---|---|---|---|---|---|
| 0 | 0 | 0 | 0 | 0 | 0 | 1 | 1 | 1 | |
| 0 | 0 | 0 | 0 | 0 | 1 | 1 | 1 | 1 | |
| 0 | 0 | 0 | 0 | 0 | 1 | 1 | 1 | 1 | |
| 0 | 0 | 0 | 2 | 2 | 2 | 1 | 1 | 1 | |
| 0 | 2 | 2 | 2 | 2 | 2 | 1 | 1 | 1 | |
| 2 | 2 | 2 | 2 | 2 | 2 | 2 | 1 | 1 | |

IMAGE PROCESSING APPARATUS, METHOD, AND PROGRAM FOR SMOOTHING BOUNDARY OF SEGMENTED REGION

CROSS-REFERENCE TO RELATED APPLICATIONS

The present application is a Continuation of PCT International Application No. PCT/JP2021/042481, filed on Nov. 18, 2021, which claims priority to Japanese Patent Application No. 2020-217837, filed on Dec. 25, 2020. Each application above is hereby expressly incorporated by reference, in its entirety, into the present application.

BACKGROUND

Technical Field

The present disclosure relates to an image processing apparatus, method, and program.

Related Art

In recent years, a machine learning technology using deep learning has attracted attention. In particular, various models have been proposed for segmenting an object included in an image by learning a convolutional neural network (hereinafter referred to as a CNN), which is one of multilayer neural networks in which a plurality of processing layers are hierarchically connected, by deep learning. For example, there has also been proposed a method of performing segmentation with high accuracy by performing a process by branching a CNN in the middle and then combining processing results (see JP2020-119568A).

On the other hand, in the case of a three-dimensional medical image consisting of a plurality of tomographic images acquired by a CT apparatus or an MRI apparatus, there is a concept of Pixel Spacing, and a length of one pixel is defined in the image. In order to perform segmentation of images having different Pixel Spacings, by aligning Pixel Spacings, it becomes easy to perform segmentation and further CNN learning. In particular, in a three-dimensional medical image, Pixel Spacing in a tomographic image plane (xy plane) is the same in both an x direction and a y direction, but Pixel Spacing in a direction (z direction) orthogonal to the tomographic image may be different from that in the x direction and the y direction in many cases. For this reason, the size of the three-dimensional image is converted so that Pixel Spacing in all directions of xyz is matched, and the segmentation is performed on the three-dimensional image after the size conversion. In this case, by applying the result of the segmentation to the three-dimensional image of the original size, the three-dimensional image of the original size can be segmented.

In addition, in order to perform segmentation at high speed, the size of the image is converted so that it is reduced in size, the image after the size conversion is input to the CNN to perform the segmentation, and a segmentation result is applied to the image of the original size.

Meanwhile, in a case where the segmentation result in the image after the size conversion is applied to the image of the original size, a problem may occur in the boundary of the segmented region. In particular, in a case where the size is reduced and the segmentation is performed, when the segmentation result is applied to the image of the original size, jaggies become conspicuous at the boundary of the segmented region.

SUMMARY OF THE INVENTION

The present disclosure has been made in view of the above circumstances, and an object of the present disclosure is to smooth a boundary of a segmented region even in a case where a segmentation result after size conversion is applied to an original image.

According to an aspect of the present disclosure, there is provided an image processing apparatus comprising at least one processor, in which the processor is configured to: convert a size of a target image to derive a size-converted image; segment the size-converted image into regions of at least one class by using a segmentation model constructed by machine-learning a neural network to derive a plurality of class images in which a pixel value of each pixel represents class-likeness for the at least one class; convert a size of at least one class image into the size of the target image to derive at least one converted class image; and segment the target image based on a pixel value in each pixel of the at least one converted class image.

In the image processing apparatus according to the aspect of the present disclosure, the size conversion may be enlargement, reduction, or normalization in at least one direction in which pixels are arranged in the target image.

Further, in the image processing apparatus according to the aspect of the present disclosure, the pixel value of the class image may be a score, which is derived by the neural network and represents a probability of being in the at least one class.

Further, in the image processing apparatus according to the aspect of the present disclosure, the processor may be configured to convert the size of the class image into the size of the target image through an interpolation calculation.

Further, in the image processing apparatus according to the aspect of the present disclosure, the processor may be configured to derive argmax of a pixel value of a corresponding pixel in the at least one converted class image to segment the target image.

Further, in the image processing apparatus according to the aspect of the present disclosure, the processor may be configured to sequentially perform derivation of the converted class image and segmentation of the target image for each class.

According to another aspect of the present disclosure, there is provided an image processing method comprising: converting a size of a target image to derive a size-converted image; segmenting the size-converted image into regions of at least one class by using a segmentation model constructed by machine-learning a neural network to derive a plurality of class images in which a pixel value of each pixel represents class-likeness for the at least one class; converting a size of at least one class image into the size of the target image to derive at least one converted class image; and segmenting the target image based on a pixel value in each pixel of the at least one converted class image.

In addition, a program for causing a computer to execute the image processing method according to the aspect of the present disclosure may be provided.

According to the aspects of the present disclosure, it is possible to smooth the boundary of the segmented region even in a case where the segmentation result after size conversion is applied to the original image.

BRIEF DESCRIPTION OF THE DRAWINGS

FIG. 3 is a functional configuration diagram of the image processing apparatus according to the first embodiment.

FIG. 6 is a diagram showing scores in class images.

FIG. 7 is a diagram showing a segmentation result using a class image.

FIG. 8 is a diagram showing converted class images.

DETAILED DESCRIPTION

Figure 1:
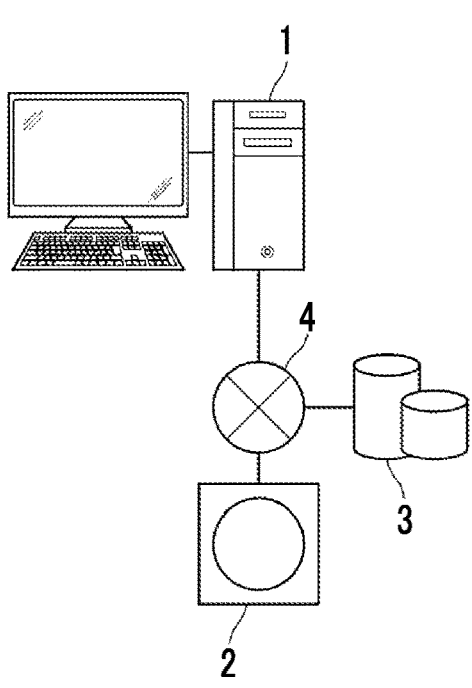
FIG. 1 is a diagram showing a schematic configuration of a diagnosis support system to which an image processing apparatus according to a first embodiment of the present disclosure is applied.

Hereinafter, embodiments of the present disclosure will be described with reference to the drawings. FIG. 1 is a hardware configuration diagram showing an overview of a diagnosis support system to which an image processing apparatus according to a first embodiment of the present disclosure is applied. As shown in FIG. 1, in the diagnosis support system, a computer 1 encompassing an image processing apparatus according to the present embodiment, an imaging apparatus 2, and an image storage server 3 are connected via a network 4 in a communicable state.

The computer 1 encompasses an image processing apparatus according to the present embodiment, and an image processing program according to the present embodiment is installed in the computer 1. The computer 1 may be a workstation or a personal computer directly operated by a doctor performing the diagnosis, or may be a server computer connected to a workstation and a personal computer via a network. The image processing program is stored in a storage apparatus of a server computer connected to the network or in a network storage in a state in which it can be accessed from the outside, and is downloaded to and installed on the computer 1 used by a doctor in response to a request. Alternatively, the image processing program is recorded on a recording medium, such as a digital versatile disc (DVD) or a compact disc read only memory (CD-ROM), and distributed, and is installed on the computer 1 from the recording medium.

The imaging apparatus 2 is an apparatus that generates a three-dimensional image representing diagnosis target parts of a subject by imaging the part, and is, specifically, the imaging apparatus 2 is a CT apparatus, an MRI apparatus, a positron emission tomography (PET) apparatus, and the like. A three-dimensional image consisting of a plurality of slice images generated by the imaging apparatus 2 is transmitted to and saved in the image storage server 3. In the present embodiment, the imaging apparatus 2 is a CT apparatus, and for example, a CT image of the thoracoabdominal region of a patient is generated as a three-dimensional image.

The image storage server 3 is a computer that saves and manages various types of data, and includes a large-capacity external storage apparatus and database management software. The image storage server 3 communicates with another apparatus via the wired or wireless network 4, and transmits/receives image data or the like. Specifically, various types of data including image data of a medical image generated by the imaging apparatus 2 are acquired via a network and saved in a recording medium such as a large-capacity external storage apparatus and managed. The storage format of the image data and the communication between the respective apparatuses via the network 4 are based on a protocol such as digital imaging and communication in medicine (DICOM).

Figure 2:
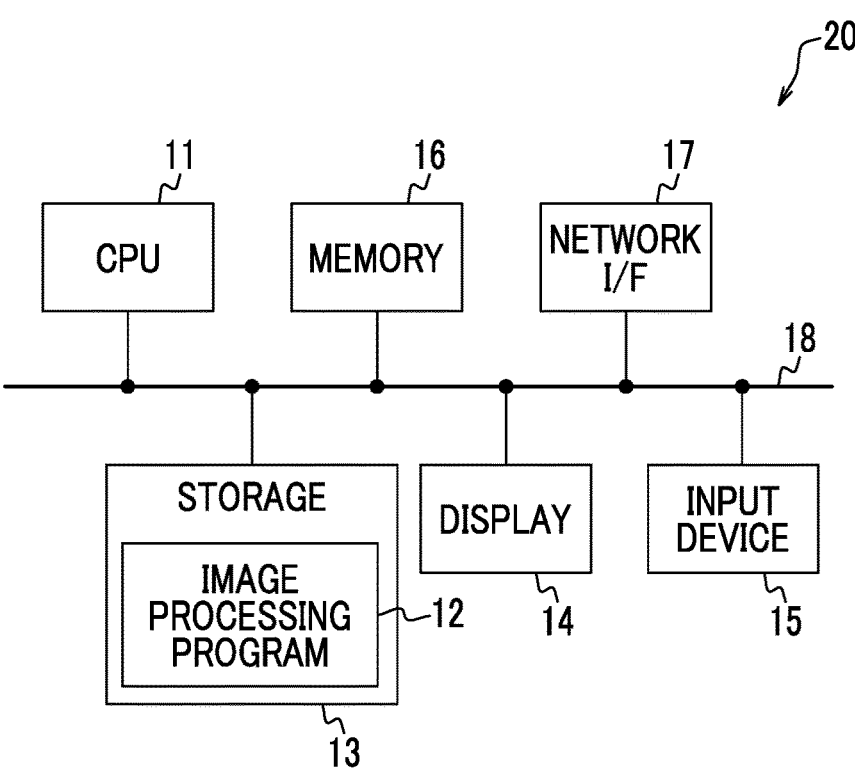
FIG. 2 is a diagram showing a schematic configuration of the image processing apparatus according to the first embodiment.

Next, the image processing apparatus according to the first embodiment will be described. FIG. 2 describes a hardware configuration of the image processing apparatus according to the first embodiment. As shown in FIG. 2, an image processing apparatus 20 includes a central processing unit (CPU) 11, a non-volatile storage 13, and a memory 16 as a temporary storage area. Further, the image processing apparatus 20 includes a display 14 such as a liquid crystal display, an input device 15 such as a keyboard and a mouse, and a network interface (I/F) 17 connected to the network 4. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid state drive (SSD), a flash memory, and the like. An image processing program is stored in the storage 13 as the storage medium. The CPU 11 reads out an image processing program 12 from the storage 13, then loads the read program into the memory 16, and executes the loaded image processing program 12.

Next, a functional configuration of the image processing apparatus according to the first embodiment will be described. FIG. 3 is a diagram showing a functional configuration of the image processing apparatus according to the first embodiment. As shown in FIG. 3, the image processing apparatus 20 comprises an image acquisition unit 21, a first conversion unit 22, a first segmentation unit 23, a second conversion unit 24, a second segmentation unit 25, and a display control unit 26. Then, as the CPU 11 executes the image processing program 12, the CPU 11 functions as the image acquisition unit 21, the first conversion unit 22, the first segmentation unit 23, the second conversion unit 24, the second segmentation unit 25, and the display control unit 26.

The image acquisition unit 21 acquires a target image G0 to be processed from the image storage server 3 in response to an instruction from the input device 15 provided by a radiologist who is an operator.

Figure 4:
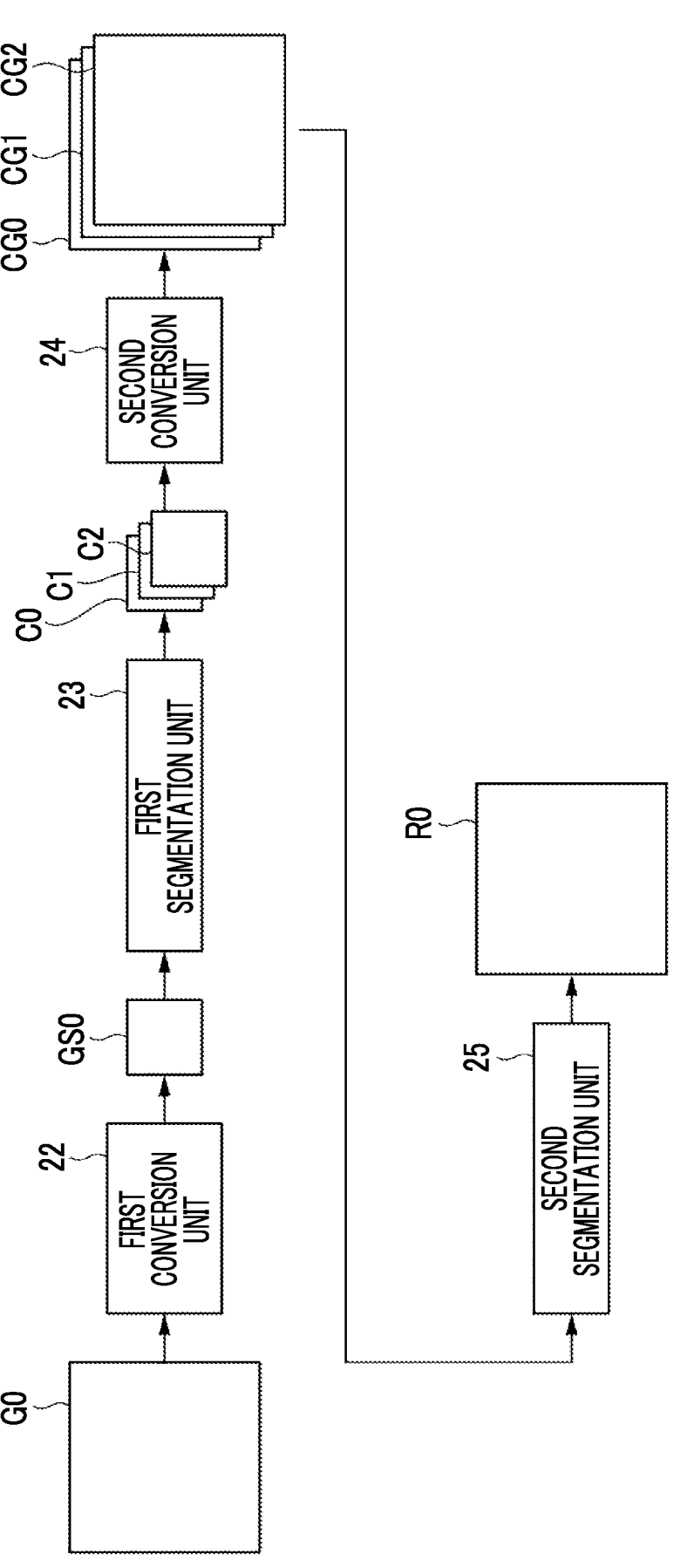
FIG. 4 is a diagram for describing a process performed in the first embodiment.

Hereinafter, processes performed by the first conversion unit 22, the first segmentation unit 23, the second conversion unit 24, and the second segmentation unit 25 will be described with reference to FIG. 4.

The first conversion unit 22 converts the size of the target image G0 to derive a size-converted image GS0. In the present embodiment, the size of the target image G0 is converted by reducing the target image G0, but the present disclosure is not limited thereto. The size-converted image GS0 may be derived by enlarging the target image G0.

Further, in a plurality of tomographic images constituting the target image G0, Pixel Spacing in the plane (xy plane) is the same in both the x direction and the y direction, but Pixel Spacing in the direction (z direction, that is, the axial direction) orthogonal to the tomographic image may be different from that in the x direction and the y direction. For this reason, the first conversion unit 22 may derive the size-converted image GS0 by converting the size of the target image G0 so that Pixel Spacing in all directions of xyz is matched. In addition, the target image G0 of any size may be normalized so that the size-converted image GS0 of a predetermined size is derived.

The first segmentation unit 23 segments the size-converted image GS0 into regions of at least one class to derive a plurality of class images in which the pixel value of each pixel represents class-likeness for at least one class. In the present embodiment, the first segmentation unit 23 segments the size-converted image GS0 into regions of a plurality of classes. To this end, the first segmentation unit 23 has a segmentation model 23A that is subjected to machine learning so that the size-converted image GS0 is segmented into regions of a plurality of classes.

In the present embodiment, the segmentation model 23A is subjected to machine learning so that the size-converted image GS0 is segmented into, for example, three classes. For example, in the present embodiment, the target image G0 is a CT image of the thoracoabdominal region of a subject. For this reason, the segmentation model 23A is subjected to machine learning so that the CT image is segmented into regions of three classes of the lung, liver, and others.

In the present embodiment, the segmentation model 23A consists of a convolutional neural network subjected to machine learning by deep learning or the like using supervised training data so that each pixel of a medical image is segmented into three objects.

Figure 5:
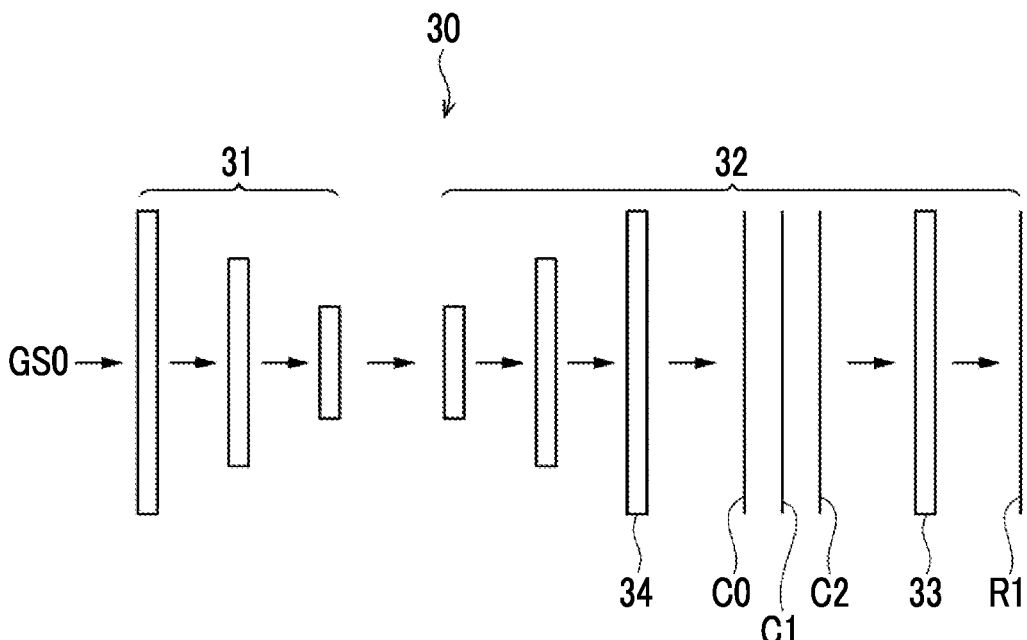
FIG. 5 is a diagram schematically showing a configuration of a segmentation model.

FIG. 5 is a diagram schematically showing a configuration of the segmentation model 23A. As shown in FIG. 5, a convolutional neural network 30 that constitutes the segmentation model 23A has an encoder 31 and a decoder 32.

Here, the convolutional neural network consists of a plurality of processing layers. The processing layer performs convolution processing using various kernels on the input image, and outputs a feature map consisting of feature amount data obtained by the convolution processing. The kernel has an n×n pixel size (for example, n=3), and weights are set for each element. Specifically, weights such as a differential filter that emphasizes edges of the input image are set. The convolutional layer of the encoder 31 applies the kernel to the entire input image or to the feature map output from the processing layer in the previous stage while shifting attention pixels of the kernel. Furthermore, the convolutional layer applies an activation function such as a sigmoid function or a softmax function to the convolved value, and outputs the feature map.

The decoder 32 segments the input image into a plurality of classes (three classes in the present embodiment) based on a feature map derived by the encoder 31. The decoder 32 also has a plurality of processing layers. The processing layer of the decoder 32 performs the same processing as the processing layer of the encoder 31, but upsamples the input feature map and applies a kernel for the deconvolution operation to the feature map.

Here, in a processing layer 34 in front of an output layer 33, the decoder 32 derives three classes of feature maps having the same size as the input size-converted image GS0 as class images C0 to C2. The class images C0 to C2 have scores representing the probability of being in each of three classes 0 to 2 for each pixel of the input image as pixel values. Further, for example, class 0 represents a region other than the lung and the liver, class 1 represents a region of the lung, and class 2 represents a region of the liver.

Here, the processing layer 34 outputs logits (regression values) as the score, but the present disclosure is not limited thereto. A value obtained by applying a softmax function to the logit may be used as the score. On the other hand, in a case where there is only one class to be segmented, a value obtained by applying a sigmoid function to the logit may be used as the score.

FIG. 6 is a diagram showing scores in the class images C0 to C2. In FIG. 6, it is assumed that the class images C0 to C2 consist of 4×5 pixels. Further, in FIG. 6, for the sake of description, it is assumed that the score takes a value of 0 to 4. As shown in FIG. 6, the class image C0 has a score of class 0, the class image C1 has a score of class 1, and the class image C2 has a score of class 2 as pixel values.

The output layer 33 of the decoder 32 outputs the segmentation result of the size-converted image GS0 by deriving argmax of the pixel values in the corresponding pixels of the class images C0 to C2. By deriving argmax, the pixel is classified into the class of the pixel having the maximum value among the pixel values of the class images C0 to C2 in a certain pixel.

Here, in a case where the class images C0 to C2 output from the processing layer 34 are those shown in FIG. 6, the segmentation result output from the output layer 33 is as shown in FIG. 7. Here, in FIG. 7, the numbers of the pixel positions represent the numerical values of classes 0 and 2. In addition, in FIG. 7, for pixels having the same score in different classes, priorities are given in the order of class 0, class 1, and class 2, and segmentation is performed.

The second conversion unit 24 converts a size of the class images C0 to C2 into the size of the target image G0 to derive converted class images CG0 to CG2. At this time, the second conversion unit 24 converts the sizes of the class images C0 to C2 through an interpolation calculation other than the nearest neighbor method. As the method of the interpolation calculation, any method such as cubic interpolation, spline interpolation, and B-spline interpolation can be used in addition to linear interpolation.

FIG. 8 is a diagram showing scores after conversion in the converted class images. As shown in FIG. 8, in the converted class images CG0 to CG2, the values of the logit are smoothly changed in a range of 0 to 4 between the pixels.

Figures 9, 10:
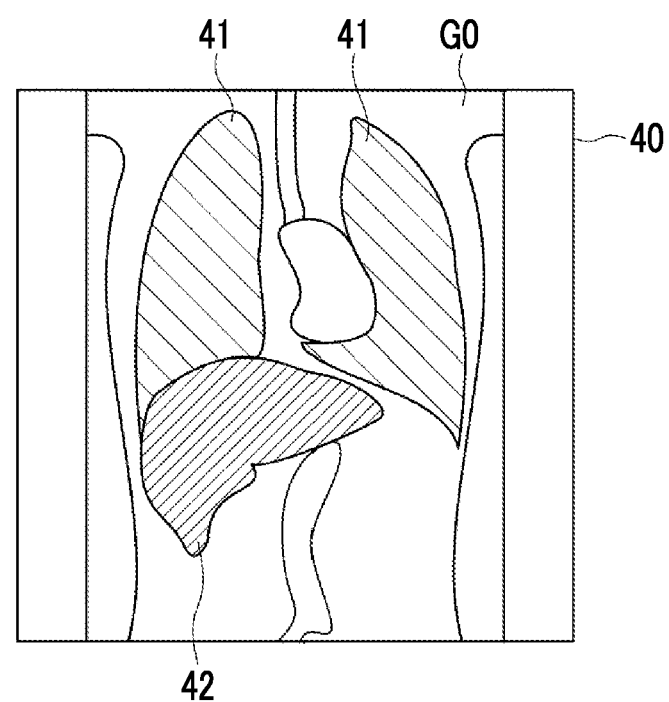
FIG. 9 is a diagram showing a segmentation result of a target image.
FIG. 10 is a diagram showing a display screen of a segmented target image.

The second segmentation unit 25 segments the target image G0 based on the pixel values (that is, logits) in the pixels of the converted class images CG0 to CG2 to derive a segmentation result RO. The second segmentation unit 25 derives argmax of the converted class images CG0 to CG2 to derive the segmentation result of the target image G0. FIG. 9 is a diagram showing the segmentation result of the target image G0. In the segmentation result RO shown in FIG. 9, each pixel of the target image G0 is segmented into class 0, class 1, and class 2 by deriving the argmax of the pixel value in the corresponding pixels of the converted class images CG0 to CG2. Note that, for pixels having the same pixel value among the converted class images CG0 to CG2, priorities may be given in the order of class 0, class 1, and class 2, and segmentation may be performed. However, the present disclosure is not limited thereto.

The display control unit 26 displays the segmentation result of the target image G0 on the display 14. FIG. 10 is a diagram showing a display screen of the segmentation result of the target image G0. As shown in FIG. 10, the display screen 40 displays the target image G0. For example, the target image G0 is a CT image of the thoracoabdominal region of a human body, in which a mask 41 is added to the lung, a mask 42 is added to the liver, and a mask is not added to a region other than the lung and the liver. Thus, the target image G0 is segmented into three classes of lung, liver, and other regions. Note that although it is difficult to illustrate, the boundaries of the lung, the liver, and other regions change smoothly.

Figure 11:
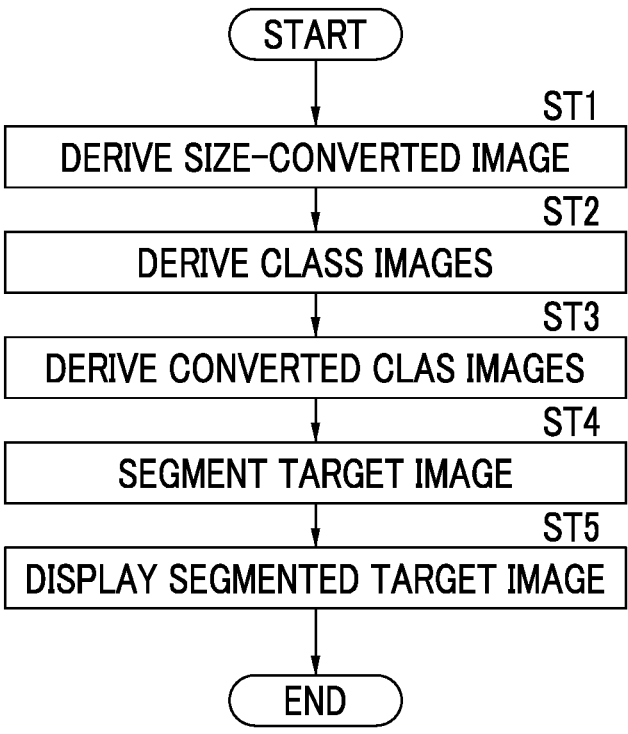
FIG. 11 is a flowchart showing a process performed in the first embodiment.

Next, a process performed in the first embodiment will be described. FIG. 11 is a flowchart showing a process performed in the first embodiment. It is assumed that the target image G0 to be processed is acquired by the image acquisition unit 21 and is saved in the storage 13. First, the first conversion unit 22 converts the size of the target image G0 to derive the size-converted image GS0 (Step ST1). Next, the first segmentation unit 23 segments the size-converted image GS0 into regions of at least one class to derive a plurality of class images in which the pixel value of each pixel represents class-likeness for at least one class (Step ST2).

Subsequently, the second conversion unit 24 converts the size of the class images C0 to C2 into the size of the target image G0 through an interpolation calculation other than the nearest neighbor method to derive the converted class images CG0 to CG2 (Step ST3). Next, the second segmentation unit 25 segments the target image G0 based on the pixel values in the pixels of the converted class images CG0 to CG2 (Step ST4). Then, the display control unit 26 displays the segmented target image G0 on the display 14 (Step ST5), and the process ends.

In this way, in the present embodiment, the class images C0 to C2 derived by segmenting the size-converted image GS0 are converted into the size of the target image G0 through an interpolation calculation other than the nearest neighbor method, and the converted class image CG0 to CG2 are derived. For this reason, by segmenting the target image G0 based on the pixel values of the converted class images CG0 to CG2, it is possible to prevent jaggies from becoming conspicuous at the boundaries of the segmented regions. Therefore, the boundaries of the segmented regions can be smoothed.

In the first embodiment, the converted class images CG0 to CG2 for all the classes are derived, and then the target image G0 is segmented, but the present disclosure is not limited thereto. The derivation of the converted class images CG0 to CG2 and the segmentation of the target image G0 may be sequentially performed for each class. Hereinafter, this will be described as a second embodiment.

Figure 12:
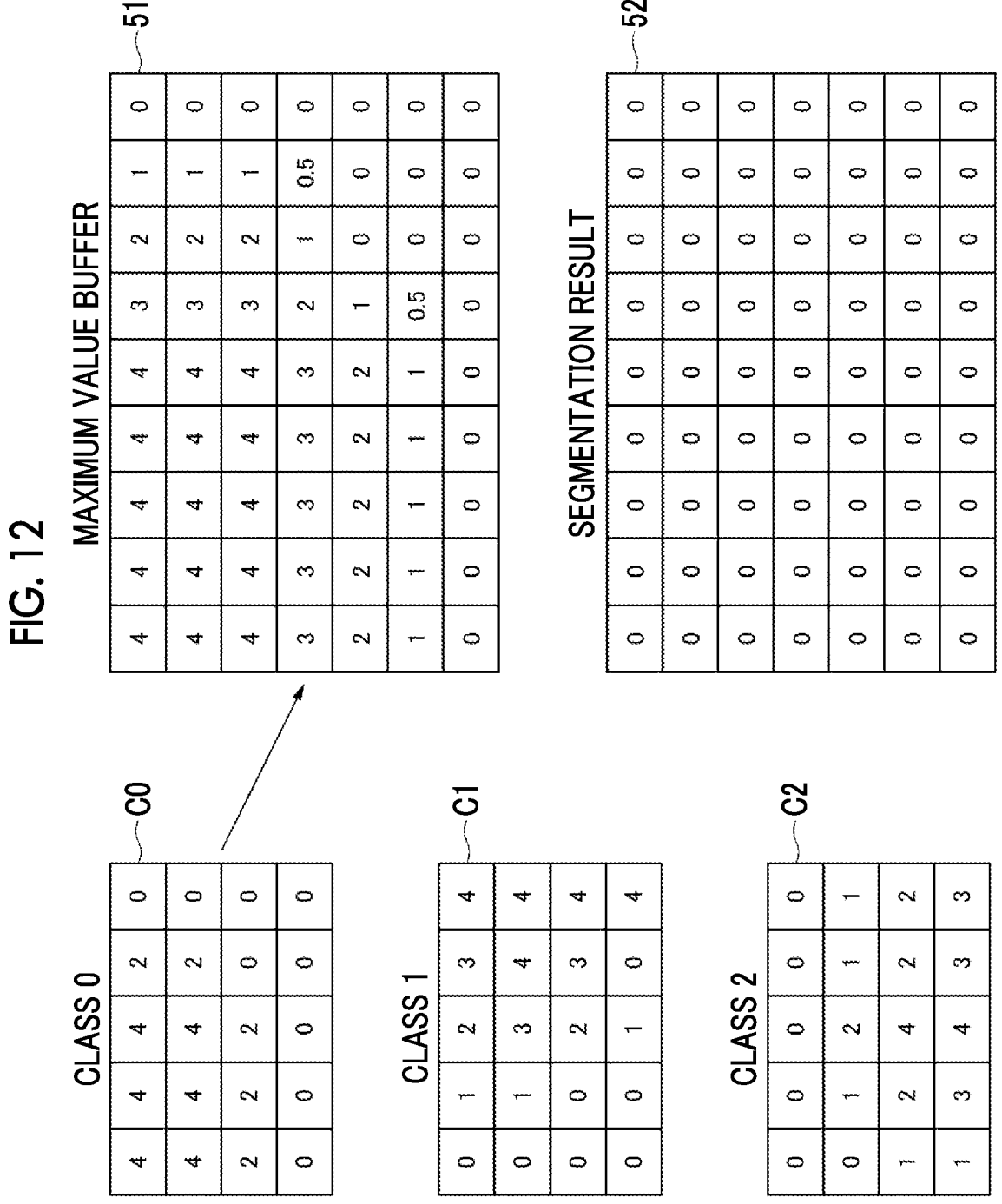
FIG. 12 is a diagram for describing a process performed in a second embodiment.
Figure 13:
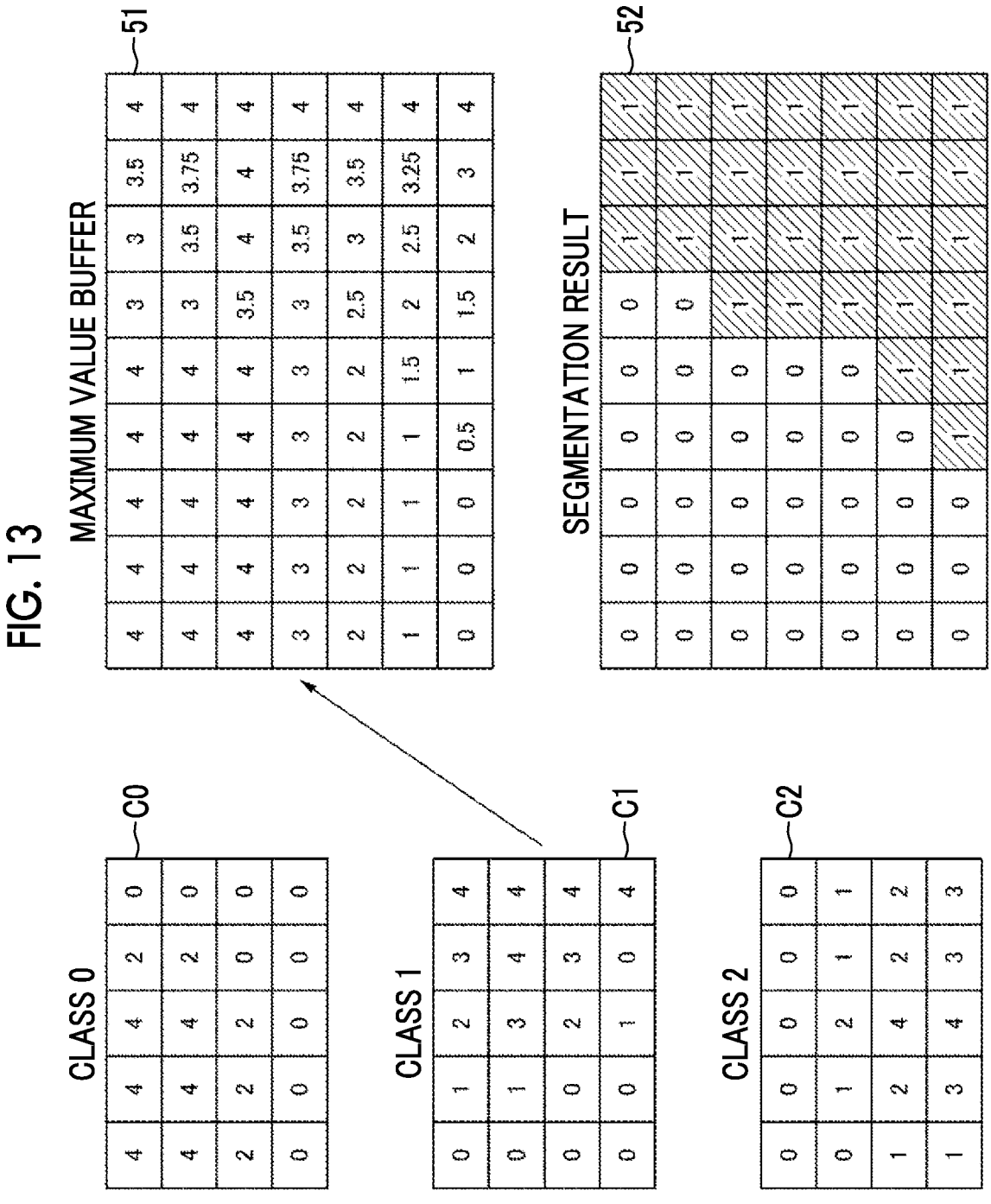
FIG. 13 is a diagram for describing a process performed in the second embodiment.
Figure 14:
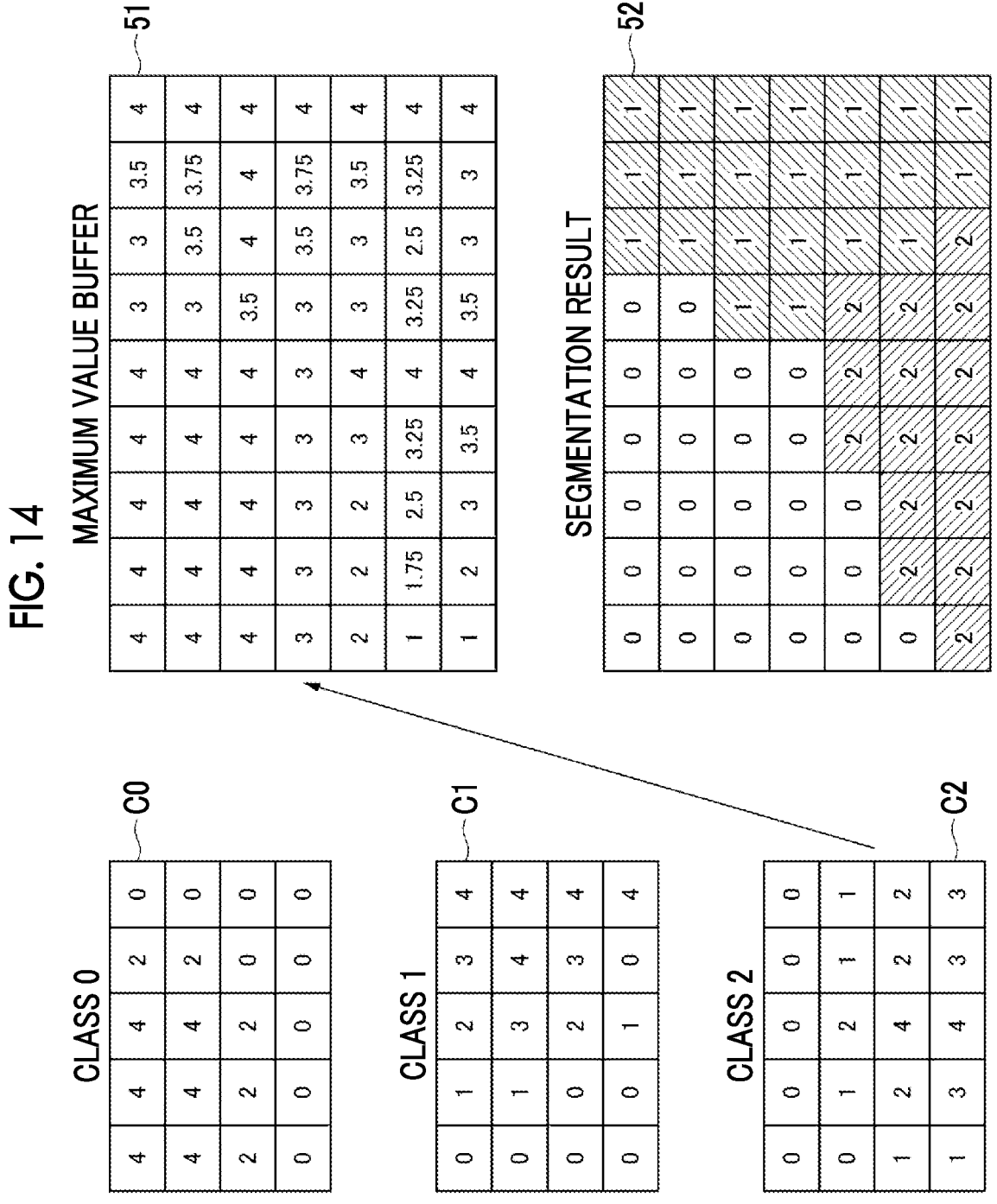
FIG. 14 is a diagram for describing a process performed in the second embodiment.

FIGS. 12 to 14 are diagrams for describing processes performed in the second embodiment. In addition, in FIGS. 12 to 14, a maximum value buffer 51 that stores the maximum value of the converted class images CG0 to CG2 used in the processing process and a segmentation result 52 are schematically shown. Both the maximum value buffer 51 and the segmentation result 52 are data areas in the memory 16.

First, as shown in FIG. 12, the second conversion unit 24 and the second segmentation unit 25 convert the size of the class image C0 of class 0 into the size of the target image G0, and store the maximum value of the converted class image CG0 in the maximum value buffer 51. The conversion of the class image into the size of the target image G0 may be performed through an interpolation calculation other than the nearest neighbor method, as in the first embodiment. At this point in time, only the converted class image CG0 of class 0 is derived. For this reason, the pixel value of each pixel of the converted class image CG0 is stored in each pixel in the maximum value buffer 51. Therefore, the segmentation result of the target image G0 at this point in time is class 0 for all the regions of the target image G0.

Next, as shown in FIG. 13, the second conversion unit 24 and the second segmentation unit 25 convert the size of the class image C1 of class 1 into the size of the target image G0, and store the maximum value of the converted class image CG1 in the maximum value buffer 51. At this point in time, the converted class image CG0 of class 0 and the converted class image CG1 of class 1 are derived. For this reason, the pixel value of each pixel in the maximum value buffer 51 is updated by the larger pixel value of the converted class image CG0 and the converted class image CG1. The target image G0 at this point in time is segmented into two regions of class 0 and class 1.

Further, as shown in FIG. 14, the second conversion unit 24 and the second segmentation unit 25 convert the size of the class image C2 of class 2 into the size of the target image G0, and store the maximum value of the converted class image CG2 in the maximum value buffer 51. At this point in time, the converted class images CG0 to CG2 of three classes of classes 0 to 2 are derived. For this reason, the pixel value of each pixel in the maximum value buffer 51 is updated by the largest pixel value among the converted class images CG0 to CG2. By referring to the maximum value buffer 51 at this point in time, the target image G0 can be segmented into three regions of classes 0 to 2.

By sequentially performing the derivation of the converted class images CG0 to CG2 and the segmentation of the target image G0 for each class as in the second embodiment, it is only necessary to use a memory for two target images G0 in processing, and it is not necessary to prepare a memory of the same size as the target image G0 for all classes. For this reason, it is possible to reduce the amount of memory used in the processing.

In each of the above-described embodiments, the target image G0 is segmented into three classes, but the present disclosure is not limited thereto. The technology of the present disclosure can also be applied to segmentation into two or four or more classes.

In addition, in each of the above-described embodiments, the lung, the liver, and other regions included in the target image G0 are segmented, but the present disclosure is not limited thereto. For example, the technology of the present disclosure can also be applied to segmentation of a bleeding region, an infarct region, and a normal region in the brain. In addition, the technology of the present disclosure can also be applied in a case where the lung is segmented into a region of a frosted glass shadow, a region of a honeycomb lung, a region of a normal lung, or the like.

Further, in the above embodiment, for example, as hardware structures of processing units that execute various kinds of processing, such as the image acquisition unit 21, the first conversion unit 22, the first segmentation unit 23, the second conversion unit 24, the second segmentation unit 25, and the display control unit 26, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. As described above, various processing units are configured by using one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. An image processing apparatus comprising:
at least one processor, configured to:
   convert a size of a target image to derive a size-converted image;
   segment the size-converted image into regions of at least one class by using a segmentation model constructed by machine-learning a neural network to derive a plurality of class images in which a pixel value of each pixel represents class-likeness for the at least one class;
   convert a size of at least one class image into the size of the target image to derive at least one converted class image; and
   segment the target image based on a pixel value in each pixel of the at least one converted class image.

2. The image processing apparatus according to claim 1, wherein the size conversion is enlargement, reduction, or normalization in at least one direction in which pixels are arranged in the target image.

3. The image processing apparatus according to claim 1, wherein the pixel value of the class image is a score, which is derived by the neural network and represents a probability of being in the at least one class.

4. The image processing apparatus according to claim 1, wherein the at least one processor is configured to convert the size of the class image into the size of the target image through an interpolation calculation.

5. The image processing apparatus according to claim 1, wherein the at least one processor is configured to derive argmax of a pixel value of a corresponding pixel in the at least one converted class image to segment the target image.

6. The image processing apparatus according to claim 1, wherein the at least one processor is configured to sequentially perform derivation of the converted class image and segmentation of the target image for each class.

7. An image processing method implemented by an image processing apparatus having at least one processor, the method comprising:
   converting, by the at least one processor, a size of a target image to derive a size-converted image;
   segmenting, by the at least one processor, the size-converted image into regions of at least one class by using a segmentation model constructed by machine-learning a neural network to derive a plurality of class images in which a pixel value of each pixel represents class-likeness for the at least one class;
   converting, by the at least one processor, a size of at least one class image into the size of the target image to derive at least one converted class image; and
   segmenting, by the at least one processor, the target image based on a pixel value in each pixel of the at least one converted class image.

8. A non-transitory computer-readable storage medium that stores an image processing program causing a computer having at least one processor to execute:
   a procedure of converting, by the at least one processor, a size of a target image to derive a size-converted image;
   a procedure of segmenting, by the at least one processor, the size-converted image into regions of at least one class by using a segmentation model constructed by machine-learning a neural network to derive a plurality of class images in which a pixel value of each pixel represents class-likeness for the at least one class;
   a procedure of converting, by the at least one processor, a size of at least one class image into the size of the target image to derive at least one converted class image; and
   a procedure of segmenting, by the at least one processor, the target image based on a pixel value in each pixel of the at least one converted class image.

* * * * *